United States Patent

[11] 3,581,772

| [72] | Inventor | Donald F. Wills<br>Suffield, Conn. |
|---|---|---|
| [21] | Appl. No. | 844,722 |
| [22] | Filed | June 30, 1969 |
| [45] | Patented | June 1, 1971 |
| [73] | Assignee | Chandler Evans Inc.<br>West Hartford, Conn. |

[54] FRICTIONLESS SPOOL VALVE
4 Claims, 4 Drawing Figs.

[52] U.S. Cl. .................................................... 137/625.69, 308/9
[51] Int. Cl. .................................................... F16k 11/07, F16c 7/04
[50] Field of Search .................................... 308/5, 9; 137/625.6—69; 251/282

[56] References Cited
UNITED STATES PATENTS

| 681,076 | 8/1901 | Porter | 137/625.69 |
| 705,730 | 7/1902 | Wilson | 137/625.69 |
| 1,637,135 | 7/1927 | Whitsitt | 137/625.69 |
| 2,675,024 | 4/1954 | Clark | 137/625.68 |
| 3,012,575 | 12/1961 | Woody et al. | 137/625.62 |
| 3,209,782 | 10/1965 | Wolpin et al. | 137/625.69X |
| 3,324,890 | 6/1967 | Whitmore et al. | 137/625.69 |
| 3,370,613 | 2/1968 | Weaver | 137/625.69 |
| 3,477,472 | 11/1969 | Mercier | 137/625.69X |

*Primary Examiner*—Henry T. Klinksiek
*Attorney*—Radford W. Luther

ABSTRACT: A spool value having two spaced lads with two pairs of diametrically opposed hydrostatic pads on an intermediate portion of each land. The pads are formed by recesses on the periphery of the lands and supplied with a pressurized fluid by means of individual orifices which fluidly communicate with a supply conduit. A radial restoring results whenever the spool is moved to a radially eccentric position with respect to a bore in which it is slideably contained.

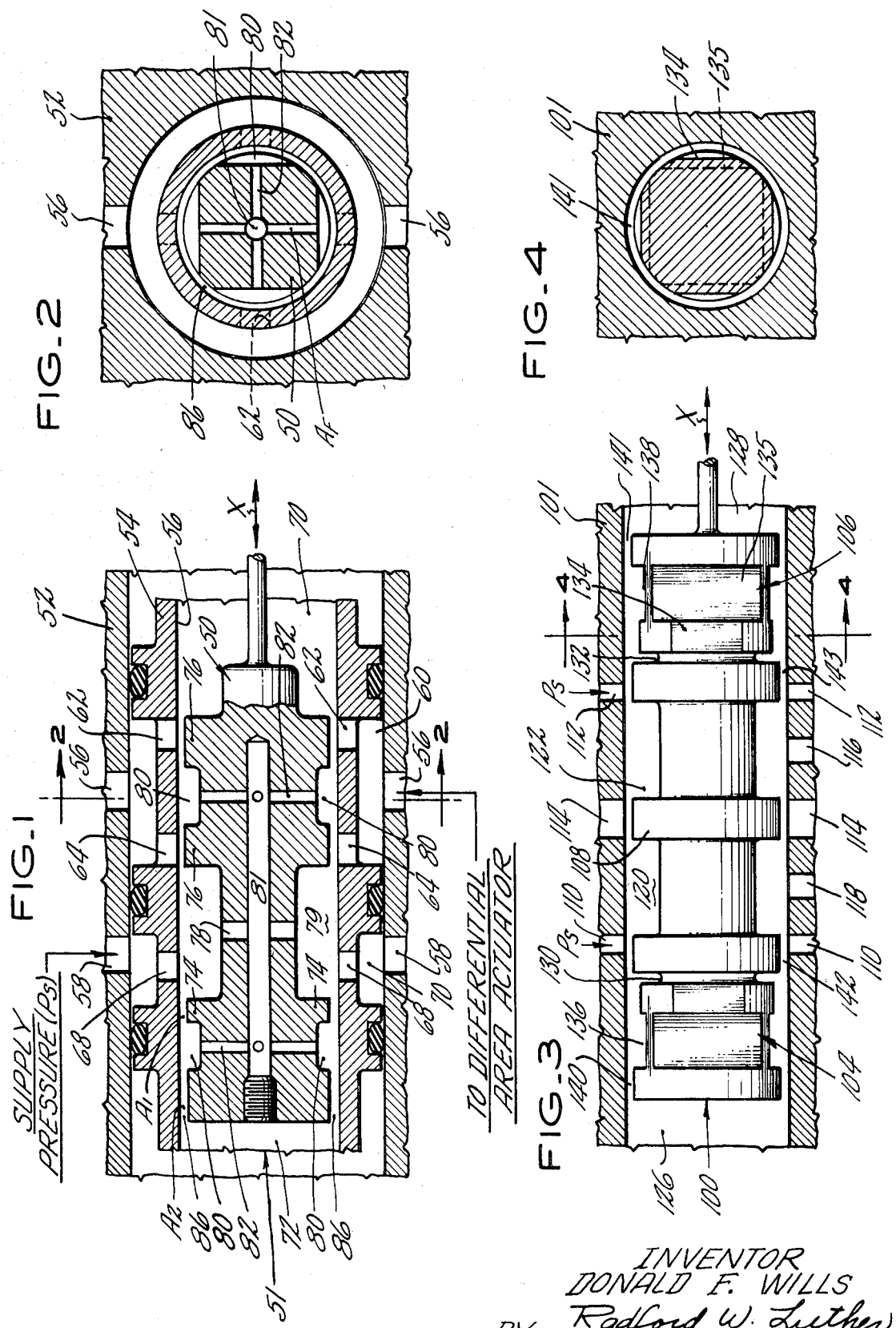

FRICTIONLESS SPOOL VALVE

BACKGROUND OF THE INVENTION

This invention relates generally to valves, and more particularly to spool valves. Even more particularly, this invention relates to valves in which a characteristic feature thereof is that all friction is reduced to purely liquid friction.

This invention further relates to spool valves which are normally used to control the supply and/or pressure of a fluid delivered to a motor or other such fluid-operated device. Even further, this invention relates to control systems which employ spool-type valves.

Fluid closed loop control systems which employ servo valves of the spool type may be subjected to instability, reduced accuracy, and limit cycling as a result of phase shift caused by valve spool friction. These adverse effects may be counteracted to the extent that friction is eliminated between the control valve spool and its housing bore.

Valves of this type are also often utilized in combination with an electrical device which is adapted to actuate the valve in accordance with an electrical input signal. It is desirable to minimize the amount of force required to move the spool of the control valve in order to reduce the magnitude of the electrical input signals. Certain applications also call for a linear relationship between the input signal directed to the electrical device and the resulting change in fluid pressure to the output member. Since friction forces in the control valve militate against low force requirements and linear operational characteristics, a reduction in the friction forces engendered during valve operation is highly desirable.

In the past, hydrostatic pads have been used in housings which contain a rotating and/or reciprocating member to support the member on a continuous fluid film. In such instances, a control means usually must be provided to regulate the pressures in the pads so as to ensure proper positioning of the member, thereby increasing the complexity of the valve structure.

U.S. PAT. No. 2,615,466, issued to A. Garde, discloses an auxiliary valve which consists of two members, viz: a movable outer sleeve which slidingly receives an inner member, the inner member having radial channels which communicate with recesses to effect a centralization of the sleeve. Movement of the sleeve controls movement of the main actuator control valve by controlling the pressure on the lands thereof. Although this arrangement is advantageous in that the force necessary for operating the valve system can be reduced to a small part of that necessary for a direct operation of the main valve, it fails to provide a means of reducing friction between the lands of the main valve and the valve housing.

SUMMARY OF THE INVENTION

The invention employs a plurality of hydrostatic diametrically opposed bearing pads placed around the periphery of a spool slideably disposed in a housing. The pads are supplied with pressurized fluid by means of individual orifices located within the spool itself or formed by additional recesses on the spool. The orifices are placed in fluid communication with a pressurized fluid inlet port in the spool housing. A radial restoring force results when the spool is moved to a radially eccentric position with respect to the bore in which it is located. The restoring force is due to a pressure loss in a given hydrostatic pad that is effected by an increase in fluid egress across the spool owing to an increased clearance between the spool and the bore adjacent the given pad and a corresponding pressure increase in a diametrically opposite pad owing to a diminished rate of fluid egress through a decreased clearance between the spool and the bore adjacent the opposite pad. Thus fluid forces will continuously act to position the spool concentric with the bore and thereby minimize the axial force necessary to move the spool.

This invention is unique in that it combines hydrostatic bearings or pads, which are well known in principle, with generally well-known valve configurations to reduce valve friction without the provision of a control means to regulate the pressures in the bearings. By adding a plurality of recesses, arranged in a unique pattern on valve spool lands and by providing a source of pressurized fluid thereto a radial centering force is caused to be imparted to the spool thereby markedly lowering the static and dynamic spool friction and contributing to a significant improvement in valve performance.

Accordingly, it is a primary object of the invention to provide a valve in which valve friction is reduced.

It is another object to provide a control valve which is not subject to the effects of adverse frictional forces which would otherwise contribute to instability and nonlinearity in a system in which the valve is incorporated.

A further object is to provide a valve which employs hydrostatic pads to reduce valve friction and yet does not require a control means to control the pressures in the pads.

A still further object of the invention is to provide a valve, suitable for inclusion in a closed loop control system, which will tend to improve the system's stability and accuracy.

The present invention, both as to its organization and manner of operation, together with further objects and advantages thereof, may best be understood by reference to the following detailed description, taken in connection with the accompanying drawings.

BRIEF DESCRIPTION OF THE DRAWINGS

FIG. 1 shows a longitudinal section taken along the centerline of a drilled orifice three-way valve of the invention.

FIG. 2 is a sectional view of the valve of FIG. 1 taken along the line 2–2 of FIG. 1.

FIG. 3 shows a longitudinal section taken along the centerline of a flatted orifice four-way valve of the invention.

FIG. 4 is a sectional view of the valve of FIG. 3 taken along the line 4–4 of FIG. 3.

DETAILED DESCRIPTION OF PREFERRED EMBODIMENTS

Turning now to the drawings, and more specifically to FIG. 1, there is shown a drilled orifice three-way valve which is primarily intended for use in a pneumatic close loop control system. A valve spool generally indicated at 50 is slideable mounted for axial movement within bore 51 of housing 52 by cylindrical valve sleeve 54. The valve housing 52 comprises two conduits 56 and 58 which respectively fluidly communicate with a downstream load connected differential area piston actuator (not shown) by means of cavity 60, and an upstream regulated pressure source (not shown). Valve sleeve 54 contains a plurality of control ports 62 and 64 which fluidly communicate with outlet conduit 56 through cavity 60 and a plurality of supply ports 68 which fluidly communicate with a pressure supply conduit 58. Drain cavities 70 and 72 formed by the outboard portions of the spool 50 and the valve sleeve 54 are connected to a drain line (not shown) at a very low pressure relative to supply pressure for reasons explained hereinafter.

The spool 50 includes two spaced lands 74 and 76, on which two pairs of diametrically opposed equal area hydrostatic pressure pads are respectively formed by recesses 80 in intermediate portions of the lands extending between respective peripheral edges thereof. The arrangement of the pads on the spool can be more easily understood by referring to FIG. 2. With this arrangement, it should be apparent that a pressure differential between two diametrically opposed pads will produce a radial force on the spool.

Turning again to FIG. 1, a pad supply duct 78 communicates supply conduit 58 by a means of cavity or annulus 79 which is defined by the spool 50, the valve sleeve 54 and the spool's lands 74 and 76. Duct 78 is fluidly coupled to a drilled pad supply passageway which is centrally located in the spool 50 and extends between the lands thereof. The recesses 80 receive fluid from passageway 81 by means of radial choked conduits 82, which form a fluid interconnection therebetween. As is evident from FIG. 2, the pads are each supplied with fluid by a separate choked conduit. The clearance 86 between the outboard portions of lands 74 and 76 and the valve sleeve 54 serves as an egress path to respective drain cavities 72 and 70 for the fluid in the recesses 80. The recesses 80 receive additional fluid from cavity 79 via clearances 86 across the portions of lands 74 and 76 which are inboard of the recesses 80.

The operation of the embodiment of FIG. 1 is as follows: when the valve spool is axially displaced to the right under the influence of control force X from the centered or neutral position shown in FIG. 1, the inboard portion of land 76 no longer blocks passageway 64 which is in constant fluid communication with the downstream load-connected differential area piston actuator via cavity 60 and conduit 56, permitting fluid of a regulated pressure to flow from inlet conduit 58 through supply port 58 into chamber 79 and out of control port 64. When the spool is in the position illustrated in FIG. 1, or in a position to the right of that shown, the outboard portion of land 76 will restrict flow from control port 62 to drain cavity 70, in that only a flow through the clearance 86 adjacent the outboard portion of the land is capable of communicating with the cavity. It should be noted that the extreme right limit of travel of the spool will not cause the port 68 to be in any way restricted by the inboard portion of land 74.

When the valve spool is shifted to the left of the centered position of FIG. 1 under the influence of control force X, the inboard portion of land 76 prevents fluid communication between cavity 79 and control port 64, except, of course, for a minor flow through the clearance 86 adjacent control port 64, while the outboard edge of land 76 uncovers control port 62 allowing fluid communication between cavity 60 and drain cavity 70, which is at drain pressure, thereby permitting a fluid flow from conduit 56 to drain, and hence relieving pressure in the region of the differential area actuator.

The air bearing pads function to keep spool 50 concentric with respect to the valve sleeve 54, Assume, for example, that a radial spool displacement occurs in a direction parallel to one of the choked conduits 82 resulting in a reduction in clearance 86 between the outboard and inboard land portions adjacent the recess which is supplied by that choked conduit and a simultaneous increase in clearance 86 adjacent the outboard and inboard land portions adjacent the diametrically opposed recess. Pressure in the recess adjacent the reduced clearance will tend to increase due to a decrease in fluid flow through clearance 86 to the drain cavity, while the pressure in the diametrically opposed recess will decrease due to an increase in fluid flow through clearance 86 to the drain cavity. A radial restoring force would then be occasioned on the spool, roughly proportional to the area of one recess multiplied by the pressure differential between the recesses. Choked conduits 82 must be so designed to restrict flow to the recesses such that a sufficient pressure drop is produced by radial displacement of the spool. In the case of a transverse spool displacement which occurs in a direction which is not in line with a choked conduit, the remaining pair of recesses also contribute a restoring force. The resultant restoring force will then be in line with this displacement.

FIG. 3 illustrates another embodiment of the invention as applied to a four-way valve, which operates in a manner similar to that described with reference to the valve of FIG. 1, and is adapted to control a load connected balanced area piston actuator. FIG. 3 shows a spool generally designated at 100 mounted within a bore in housing 101 for sliding axial movement. At the outboard portion of spool 101 are lands generally denoted 104 and 106 which include hydrostatic pads, as will be more fully explained hereinafter. Spool 101 also includes a centrally positioned land 108. Housing 101 is provided with pressurized fluid supply conduits 110 and 112 which are in fluid communication with a source of regulated pressure (not shown) and an exhaust or return conduit 114. In the center position of the spool 100, illustrated in FIG. 3, the inlet supply ports of conduits 110 and 112 are substantially covered by lands 104 and 106 respectively, while the outlet exhaust port of exhaust conduit 114 is blocked by the center land 108. Conduits 116 and 118 are respectively fluidly connected to two sides of a load-connected equal area piston actuator (not shown). Conduits 118 and 116 receive fluid from or exhaust fluid to respective cavities or annuli 122 and 120, disposed between the lands of spool 100, in accordance with the direction of spool displacement by control force X. The outboard faces of lands 104 and 106 and the spool housing form respective drain cavities 126 and 128 which serve the same purpose as drain cavities 70 and 72 of the embodiment of FIG. 1.

The novel construction of the outboard lands 104 and 106 can best be understood with reference to FIG. 4. Lands 104 and 106 respectively embody circumferential grooves 130 and 132, the purpose of which is to evenly distribute the pressure respectively derived from the conduits 110 and 112 to the orifices formed on the lands.

Referring now to FIG. 4, there is shown a sectional view of the land 106, which, of course, is identical to the land 104. The periphery of the land 106 has a plurality (e.g., four) of circumferentially spaced, axially extending, relieved portions formed by surfaces 134, the relieved portions defining a plurality of axially extending orifices. The orifices receive pressurized fluid from the groove 132 and direct respective axial flows of fluid to a plurality of recesses 138 on the periphery of the land 106 which are each defined by circumferentially spaced recessed surfaces or hydrostatic bearing pads 135. The surfaces 134 and 135 may be flat or planar; It will be noted from FIG. 3 and 4 that the outlets of the orifices are respectively contiguous with the recesses at the inboard axial ends of the recesses. As FIG. 4 shows, the pads are formed between peripheral edges of the lands in the same manner as those of FIG. 1. The clearance 140 and 141 formed between the end portions of the respective lands 104 and 106 and the housing 101 permit fluid from the pads to pass therethrough to the drain cavities which are at a very low pressure relative to the supply pressure $P_s$. The clearances 142 and 143, which lie between the lands and the housing adjacent respective conduits 110 and 112 and supply the grooves 130 and 132, will vary in length as the spool position is changed, but the limits of the spool's axial movement will be such that the grooves will never directly overlie the supply conduits so as to conserve supply fluid.

When spool 100 is shifted to the right under the influence of the control force X, supply conduit 112 is placed in fluid communication with conduit 116 via annulus 122, conduit 116 being in constant communication with a side of a downstream load-connected balanced area piston. As the piston moves because of the pressure differential produced thereacross, fluid adjacent the other side of the piston is expelled through conduit 118 which is in fluid communication with exhaust conduit 114 via annulus 120. Contrariwise, if the spool is shifted to the left from the centered position of FIG. 3, the pressure will increase on the side of the piston which fluidly communicates with conduit 118 (which is now in communication with supply conduit 110) and decrease on the side of the piston which is in fluid communication with conduit 116 (which is now in communication with exhaust conduit 114) thereby displacing the piston in an opposite sense.

The functioning of the hydrostatic bearing pads will only be explained with reference to land 106, as both outboard lands are identical in construction and operation. Fluid of a regulated pressure traverses the clearance path 143 between the inboard portion of land 106 and housing 101 to circumferential pressure balance groove 132 which functions to furnish an equal supply of fluid to each of the orifices formed by surfaces 134, the pressures in equal area orifices being equal. These orifices, which in this case extend between peripheral edges of the land, perform the exact function as the drilled choked orifices 82 of FIG. 1, namely, the supply of fluid to the hydrostatic pads. Fluid from these orifices respectively communicates with the four recesses 138 which are defined by the surfaces 135 and the periphery of land 106. Fluid from the recesses 138 finds an egress route to the low pressure drain cavity 128 through the clearance 141. As spool 100 is shifted radially to an eccentric position with respect to the bore in housing 101, the clearance 141 will increase on one side of the spool and correspondingly decrease on the other side thereof. Fluid flow resistance through clearance 141 through the respective sides of the spool will increase or decrease by a much larger percentage than the respective resistance to flow through its associated orifice as the radial spool displacement is occasioned. Therefore, the fluid supply available to the recesses 138 will vary only to a small extent during radial displacement while the rate of fluid egress through the clearance 141 will vary widely as a function of radial clearance. Diametrically opposed recesses will then contain fluids at pressures that will tend to generate a radial restoring force to center the spool, as was the case in the embodiment of FIG. 1.

Obviously many modification of the disclosed embodiments are possible, in light of the above teachings, without departing from the scope or spirit of the invention.

I claim:

1. In a valve, the combination of a housing having a bore therein, a conduit communicating with the bore for supplying pressurized fluid thereto, a spool, having a land integral therewith, mounted within the bore for axial movement therein, the periphery of the land having a plurality of peripherally spaced recessed surfaces respectively defining a plurality of recessed spaced around the land and a plurality of axially extending, peripherally space, relieved portions respectively defining a plurality of axially extending orifices, the orifices being respectively contiguous with the recesses at the axial ends thereof and being adapted to direct flows of pressurized fluid thereto, means to communicating with the supply conduit to supply equal pressure to the orifices, means producing flow from the recesses through clearance path means defined by the periphery of the spool and the housing and whereby displacement of the spool to an eccentric position with respect to the bore will selectively vary the pressures in the recesses to produce a differential pressure acting on the recessed surfaces which will generate a force tending to restore the spool to concentricity within the bore.

2. The combination of claim 1, wherein the communicating means comprises a circumferential groove around the periphery of the land in direct communication with the orifices.

3. The combination of claim 1, wherein the supply conduit communicates with the bore adjacent the land such that the grooves receives pressurized fluid from a clearance defined between the periphery of the land and the housing, and wherein the limits of axial spool movement are such that the groove never directly overlies the supply conduit, whereby an excessive amount of pressurized fluid is not required to supply the orifices.

4. The combination of claim 1, wherein the recessed surfaces are planar and the relieved portions are formed by planar surfaces.